United States Patent [19]

Sharangpani et al.

[11] Patent Number: 5,125,975
[45] Date of Patent: Jun. 30, 1992

[54] PURIFICATION OF OPAL AND OPAL OLEATE TO REMOVE ANILINE

[76] Inventors: Anand Sharangpani, 13881 Fox Trail Dr., Holland, Mich. 49424; Joseph D. Maciejewski, 514 Slayton, Grand Haven, Mich. 49417; John R. Parker, 202 W. 20th St., Holland, Mich. 49423

[21] Appl. No.: 720,352

[22] Filed: Jun. 25, 1991

[51] Int. Cl.⁵ .......................... C08K 5/16; C04B 16/00
[52] U.S. Cl. ...................................... 106/408; 106/493
[58] Field of Search ................................ 106/408, 493

[56] References Cited

U.S. PATENT DOCUMENTS

| 3,671,553 | 6/1972 | Papenfuss et al. |
| 4,321,207 | 3/1982 | Cesark ................... 260/391 |
| 4,944,806 | 7/1990 | Sharangpani et al. ........... 106/493 |

Primary Examiner—William R. Dixon, Jr.
Assistant Examiner—Scott L. Hertzog

[57] ABSTRACT

Opal and opal oleate with aniline contents of less than 500 parts per million are prepared by dissolving opal in sulfuric acid and recrystallizing. The recrystallized opal is converted to opal oleate using oleic acid. The opal oleate with low aniline content finds application in the specialty colorants field.

10 Claims, No Drawings

PURIFICATION OF OPAL AND OPAL OLEATE TO REMOVE ANILINE

FIELD OF THE INVENTION

The present invention relates to a process of preparing substantially aniline free opal and opal oleate, and also to the opal and opal oleate so prepared

BACKGROUND OF THE INVENTION

Opal oleate is a pigment product currently utilized for toning carbon black for use in typewriter ribbons and computer tape, for example. Opal oleate is prepared by reacting opal with oleic acid according to various methods. The structural formula for opal oleate is as follows:

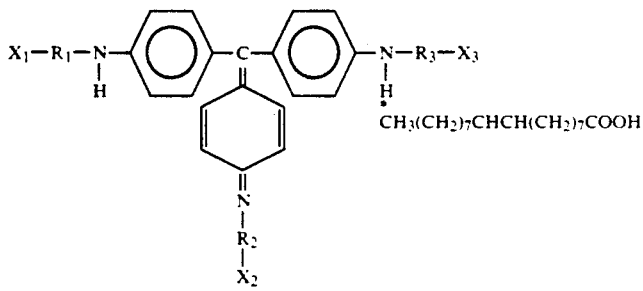

$$CH_3(CH_2)_7CHCH(CH_2)_7COOH$$

wherein $R_1$, $R_2$ and $R_3$ are $C_6H_5$, and $X_1$, $X_2$ and $X_3$ are H.

The opal itself (e.g. Spirit Blue C.I. 42760) from which opal oleate is derived is prepared by phenylating pararosaniline base with aniline using glacial acetic acid as a catalyst. Opal primarily consists of triphenylated pararosaniline or TPRR, whose structural formula is as follows:

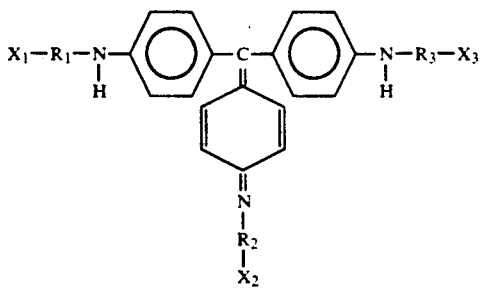

wherein $R_1$, $R_2$ and $R_3$ are $C_6H_5$, and $X_1$, $X_2$ and $X_3$ are H.

The general formula for the triphenylmethane compound is:

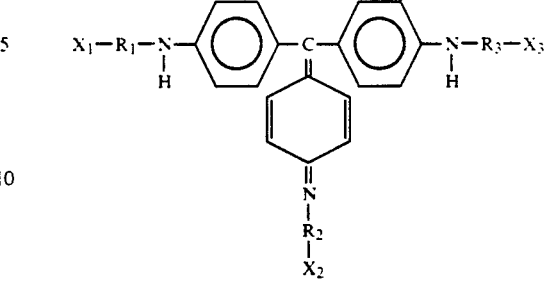

wherein $R_1$, $R_2$, and $R_3$ are direct linkages, phenyl or naphthyl groups; $R_4$ is hydrogen or methyl; $X_1$, $X_2$, and $X_3$ are hydrogen, halogen alkyl or alkoxy of 1 to 4 carbons; provided that at least one of $R_1$, $R_2$ and $R_3$ is not a direct linkage and provided that $X_1$, $X_2$ or $X_3$ is hydrogen when the corresponding $R_1$, $R_2$ and $R_3$ is a direct linkage.

The reaction for the preparation of opal is conducted in aniline which is distilled off at the end of the reaction, thereby isolating the opal as a solid. The hue of opal depends on the degree of phenylation and typically varies from red to green. Lower codes of opal (such as OB-30 and OB-60) normally contain higher, e.g. 5-10%, levels of aniline after reaction. It is difficult to remove all the aniline from the opal product by physical means because opal has a high affinity for aniline.

Unfortunately, the aforesaid levels of aniline remaining in the opal product, and subsequently in the opal oleate prepared with the aforesaid opal, are currently viewed as unsatisfactory. This is because aniline is a relatively toxic substance and is suspected of being a carcinogen.

Process development work was conducted in the early 1980's to reduce the level of aniline in opal by vacuum distillation using a wiped film evaporator. The effects of various process parameters such as feed rate, opal concentration in the feed, jacket temperature and degree of vacuum were studied to optimize the operation from the standpoint of throughput and aniline content in the product. In most instances, opal could be produced with a residual aniline content of 4-7%. At one point, the aniline content was reduced to about 2% or higher, but the opal product was extremely difficult to flake and could not be used for subsequent conversion to opal oleate. This development work failed to produce a workable opal product with less than 0.5% aniline.

There currently exists a need in the art to produce opal and opal oleate with extremely low levels of aniline (about 500 parts per million (p.p.m.) or less) for applications in the specialty colorants field. Preparation of substantially "aniline free" opal and subsequently its oleate have remained a goal of those skilled in the art.

OBJECTS OF THE INVENTION

It is therefore an object of the present invention to provide opal and opal oleate with extremely low levels of aniline for applications in the specialty colorants field.

It is a further object of the invention to produce opal and opal oleate with about 500 ppm or less of aniline.

It is another object of the invention to provide opal and subsequently opal oleate with less than about 200 ppm aniline content.

Another object of the invention is to provide a method for producing substantially aniline free opal and opal oleate.

SUMMARY OF THE INVENTION

These and other objects of the invention are achieved by first purifying opal using sulfuric acid. This involves dissolving prepared opal product containing aniline in the sulfuric acid. The opal itself is then recrystallized, leaving the aniline in the sulfuric acid which is subsequently removed. At this stage, the opal will have an aniline content of less than about 500 p.p.m., and preferably less than about 200 p.p.m., most preferably less than about 150 p.p.m. Subsequent conversion of the opal using oleic acid will hereby form opal oleate having an aniline content of less than about 200 p.p.m. of aniline, and preferably less than about 80 p.p.m., most preferably less than about 60 p.p.m. On a weight basis, less than about 0.05% aniline will remain in the opal and subsequently less than about 0.02% in the opal oleate. Thus, the level of aniline in the opal oleate will approach a maximum of about 40% of that in the purified opal due to the dilution effect upon reaction of the opal with oleic acid.

DETAILED DESCRIPTION OF THE PREFERRED EMBODIMENTS

The preparation of opal oleate having less than 200 ppm aniline involves substantially two process steps. The first step is the purification of the opal which contains the aniline. Crushed opal with a high aniline content, typically around 10% or more on a weight basis, is first dissolved in concentrated sulfuric acid. The minimum concentration of sulfuric acid should be about 80%. Preferably, 86% sulfuric acid is utilized. The solution of opal and sulfuric acid is then stirred until no undissolved opal can be detected on a glass filter. The process of dissolving the opal can take anywhere from about 2 hours to about 4 hours.

Next, the solution of opal in sulfuric acid is drowned in water under turbulent mixing. The resulting slurry is then pumped to a filter press to form a presscake. The resulting presscake is then washed to a pH within the range of about 3.0 to 7.0 using water. Preferably, the presscake will be washed to a pH of about 3.5.

The presscake is then reslurried with water and the pH of the resulting solution is then raised to within the range of 10.0 to 13.0 using basic solution, e.g. caustic soda. The target pH is about 11.8. The slurry is stirred for a period of time to ensure mixing and then pumped to a filter press to again form a presscake. The presscake is then again washed to a pH of about 7.0 to 9.0, preferably 8.0, with water.

Afterwards, the presscake is dried for about 48 hours at elevated temperature, preferably around 50 degrees C. The resulting product will have an aniline content of less than 500 ppm, preferably less than 200 ppm, and most preferably less than 150 ppm.

The following example will illustrate the purification of opal to remove the aniline according to a particularly preferred embodiment of the invention. Those skilled in the art will recognize that this example should in no way be construed as limiting the scope of the invention:

EXAMPLE 1

12.2 lbs. of crushed opal (OB-30) containing 10.7% by weight of aniline was added to 86% sulfuric acid (48.8 lbs.) in a 5 gal. Myers mixer over 2 hours while maintaining a temperature of 30 degrees C. or less. After stirring for 5 hrs. undissolved opal could not be detected when filtered on a fritted glass filter.

The solution of opal in sulfuric acid was discharged into 80 gallons of water under turbulent mixing using a stator-rotor agitator. After stirring for two hours the slurry was pumped to a filter press (four 20" chambers) cake washed to pH of 3.5 with 130 gallons of water.

The presscake was reslurried in 37 gallons of water and the pH of the slurry was adjusted to 11.8 with 2.9 lbs. of 50% caustic soda. After stirring for 2 hours (pH=11.5) the slurry was pumped to the filter press. The cake was washed to a pH of 8.0 using 83 gallons of water.

The presscake was dried for 48 hours at 50 degrees C. The yield of resulting product was 10.1 lbs. and had an aniline content of 152 parts per million.

The second major process step in the preparation of opal oleate involves the reaction of oleic acid with the opal purified in the manner heretofore outlined. The opal oleate or a dispersion of opal in oleic acid may be prepared from any of the methods known in the art. The three most often utilized processes are the Attritor or Dispersion Method, the Cowles Mixer Method and the Flusher Method. The following examples will illustrate each of these methods. These example should also not be construed as limiting the scope of the invention:

EXAMPLE 2

Dispersion Method - 150 grams of oleic acid, 10 grams of diethylene glycol and 52.5 grams of purified opal (OB 30) was dispersed using a Cowles mixer. The dispersion was then warmed to 50 degrees C. and mixed for 30 minutes. The mixture was next poured into an Attritor with 500 grams of 1 mm Zircon media. The Attritor was run at a setting of (40) for 30 minutes. Results were as follows: % insolubles was 0.30 and solubility evaluation was 3 lines>10 microns.

EXAMPLES 3

Dispersion Method - The same method was followed as in Example 2 above, but the starting materials were 110 grams of oleic acid, 20 grams of diethylene glycol and 70 grams of opal (OB 30). % insolubles was 0.60 and solubility evaluation was 2 lines>10 microns.

EXAMPLE 4

Dispersion Method - The same method was again followed as in Example 2 above with the same starting materials. % insolubles was 0.31 and solubility evaluation was 1 line>10 microns. The rheology test was 89 seconds.

EXAMPLES 5

Flusher Method - The starting materials were 300 grams of dry opal (OB 30) (1,091 grams in Presscake form), and 471 grams of oleic acid. 1,091 grams of PCK (presscake) were added to the Flusher, and then 203 grams of oleic acid were added slowly over a period of 17 minutes. 97 grams of oleic acid were further added and the vacuum was then turned on. After 1 hour and 55 minutes, the moisture was checked and the balance of the oleic acid was added over an hour. The mixture was then discharged at 55 degrees C. % insolubles was 1.20 and solubility evaluation was 2 lines>10 microns. Rheology test was 188 seconds.

EXAMPLE 6

Cowles Mixer Method - The starting materials were 330 grams of oleic acid, 60 grams of propylene glycol and 210 grams of opal (OB 30). 330 grams of oleic acid and 60 grams of propylene glycol were added to a 1 liter S.S. beaker. The Cowles was then inserted and run at (40) medium setting. The mixture was then heated to 50 degrees C. 210 grams of the opal was then added slowly over 45 minutes. This mixture was then mixed at 50-55 degrees C. for 4 hours. The oleate mixture was then run through a coarse filter screen. % insolubles was 0.31 and solubility evaluation was 2 lines>10 microns. Rheology test was 71 seconds.

EXAMPLE 7

Flusher Method - The starting materials were 600 grams of opal (OB 60) and 943 grams of oleic acid. The presscake was added 2524 grams (the equivalent of 600 grams of dry opal as starting material) in 4 shots: ⅓, ⅓, 1/6 and 1/6. The quantity of oleic acid added per each shot was as follows: 204 g, 289 g, 77 g and 73 g. The vacuum was turned on for a period of 4½ hours. The mixture was then thinned with the remaining 300 grams of oleic acid under vacuum. % insolubles was 3.7 and the solubility evaluation was 6 lines>10 microns. The rheology test was 122 seconds.

While the invention has been described in each of its embodiments it is to be understood that modifications may occur to those skilled in the art without departing from the spirit and scope thereof as set forth in the following claims:

What is claimed is:

1. A method for the preparation of opal oleate having an aniline content of less than about 500 p.p.m., said process comprising the steps of:
   a) purifying a quantity of opal with sulfuric acid having a minimum concentration of about 80%, after which said purified opal will have an aniline content of less than about 500 p.p.m., and
   b) reacting said purified opal with oleic acid so as to form opal oleate having an aniline content of less than about 200 p.p.m.

2. The method as claimed in claim 1, wherein said purifying step comprises dissolving said opal in said sulfuric acid and then recrystallizing said opal.

3. The opal oleate prepared according to the process as claimed in claim 1.

4. The opal oleate prepared according to the process as claimed in claim 3, wherein said opal oleate has an aniline content of less than about 80 p.p.m.

5. The opal oleate prepared according to the process as claimed in claim 4, wherein said opal oleate has an aniline content of less than about 60 p.p.m.

6. A method for the preparation of opal having an aniline content of less than about 500 p.p.m., comprising dissolving a quantity of opal in sulfuric acid and then recrystallizing said opal.

7. The opal prepared according to the method of claim 6.

8. The method as claimed in claim 1, wherein said sulfuric acid has a concentration of 86%.

9. A method for the preparation of opal oleate having an aniline content of less than about 500 p.p.m., said process consisting essentially of the steps of:
   a) purifying a quantity of opal with sulfuric acid having a minimum concentration of about 80%, after which said purified opal will have an aniline content of less than about 500 p.p.m.; and
   b) reacting said purified opal with oleic acid so as to form opal oleate having an aniline content of less than about 200 p.p.m.

10. The method as claimed in claim 9, wherein said sulfuric acid has a concentration of 86%.

* * * * *